US010800417B2

United States Patent
Kinoshita et al.

(10) Patent No.: US 10,800,417 B2
(45) Date of Patent: Oct. 13, 2020

(54) CONTROL APPARATUS FOR VEHICLE

(71) Applicant: SUBARU CORPORATION, Tokyo (JP)

(72) Inventors: Takahiro Kinoshita, Tokyo (JP); Hirofumi Shimizu, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 218 days.

(21) Appl. No.: 15/949,951

(22) Filed: Apr. 10, 2018

(65) Prior Publication Data
US 2018/0297599 A1 Oct. 18, 2018

(30) Foreign Application Priority Data

Apr. 18, 2017 (JP) .................................. 2017-081742

(51) Int. Cl.
*B60W 30/18* (2012.01)
*B60W 10/06* (2006.01)
(Continued)

(52) U.S. Cl.
CPC .... *B60W 30/18181* (2013.01); *B60W 10/026* (2013.01); *B60W 10/06* (2013.01);
(Continued)

(58) Field of Classification Search
CPC .... B60W 10/026; B60W 10/06; B60W 10/08; B60W 10/30; B60W 30/18;
(Continued)

(56) References Cited

U.S. PATENT DOCUMENTS

2005/0090365 A1* 4/2005 Tamai ...................... B60K 6/48
477/5
2009/0048745 A1* 2/2009 Wu .......................... B60K 6/24
701/51
(Continued)

FOREIGN PATENT DOCUMENTS

JP H 08-099564 A 4/1996
JP 2000-097068 A 4/2000
(Continued)

OTHER PUBLICATIONS

Japanese Office Action, dated Feb. 19, 2019, in Japanese Application No. 2017-081742 and English Translation thereof.
(Continued)

*Primary Examiner* — Edwin A Young
(74) *Attorney, Agent, or Firm* — McGinn I.P. Law Group, PLLC.

(57) ABSTRACT

A control apparatus for a vehicle that includes an engine includes an electric generator, a throttle valve, an electric generator control unit, and a throttle control unit. The electric generator is configured to be coupled to the engine. The throttle valve is configured to control an amount of intake air of the engine. The electric generator control unit is configured to allow the electric generator to perform regenerative power-generation on decelerated travel of the vehicle. The throttle control unit is configured to control the throttle valve openwise on the decelerated travel. The electric generator control unit is configured to cause an increase in power-generation torque of the electric generator, upon a switchover of the engine from a fuel cut state to a fuel injection state on the decelerated travel.

9 Claims, 11 Drawing Sheets

(51) Int. Cl.

| | |
|---|---|
| *B60W 10/02* | (2006.01) |
| *F02D 9/02* | (2006.01) |
| *F02P 5/15* | (2006.01) |
| *F02D 41/12* | (2006.01) |
| *F02D 29/06* | (2006.01) |
| *F02D 35/00* | (2006.01) |
| *F02D 41/02* | (2006.01) |
| *F02N 11/08* | (2006.01) |
| *F02N 11/04* | (2006.01) |

(52) U.S. Cl.
CPC .. *B60W 30/1819* (2013.01); *B60W 30/18127* (2013.01); *F02D 9/02* (2013.01); *F02D 29/06* (2013.01); *F02D 35/0023* (2013.01); *F02D 41/123* (2013.01); *F02P 5/15* (2013.01); *B60W 2520/105* (2013.01); *B60W 2710/024* (2013.01); *B60W 2710/0605* (2013.01); *B60W 2710/0627* (2013.01); *F02D 41/022* (2013.01); *F02D 2200/50* (2013.01); *F02N 11/04* (2013.01); *F02N 11/0814* (2013.01); *F02N 11/0866* (2013.01); *F02N 2011/0885* (2013.01); *F02P 5/1504* (2013.01)

(58) Field of Classification Search
CPC ....... B60W 30/18181; B60W 30/18127; F02D 29/06; F02N 11/0814; F02P 5/1504
See application file for complete search history.

(56) References Cited

U.S. PATENT DOCUMENTS

2012/0109480 A1* 5/2012 Morimura ........... B60W 10/026
701/70
2016/0288651 A1 10/2016 Kinoshita

FOREIGN PATENT DOCUMENTS

| JP | 2007-113507 A | 5/2007 |
|---|---|---|
| JP | 2008-215295 A | 9/2008 |
| JP | 2013-071585 A | 4/2013 |
| JP | 2014-095358 A | 5/2014 |
| JP | 2015-010493 A | 1/2015 |
| JP | 2016-193634 A | 11/2016 |

OTHER PUBLICATIONS

Japanese Office Action, dated Sep. 24, 2019, in Japanese Application No. 2017-081742 and English Translation thereof.

* cited by examiner

CONTROL APPARATUS FOR VEHICLE

CROSS-REFERENCE TO RELATED APPLICATIONS

The present application claims priority from Japanese Patent Application No. 2017-081742 filed on Apr. 18, 2017, the entire contents of which are hereby incorporated by reference.

BACKGROUND

The technology relates to a control apparatus for a vehicle that includes an engine.

A vehicle such as an automobile includes an electric generator such as a motor generator, an alternator, and an integrated starter generator (ISG). In many cases, the electric generator is controlled to a regenerative power-generation state on decelerated travel, from viewpoint of enhancement in fuel consumption performance of the vehicle, as described in Japanese Unexamined Patent Application Publication (JP-A) No. 2000-97068. Non-limiting examples of the decelerated travel may include coasting, and braking of the vehicle. Moreover, in a case of regenerative power-generation of the electric generator on the decelerated travel, a control apparatus described in JP-A No 2000-97068 opens a throttle valve, and thereby reduces a pumping loss of an engine. This makes it possible to reduce an engine load, and to increase a power-generation load, leading to an increase in power-generated electric power of the electric generator, and the enhancement in the fuel consumption performance of the vehicle.

SUMMARY

An aspect of the technology provides a control apparatus for a vehicle that includes an engine. The control apparatus includes an electric generator, a throttle valve, an electric generator control unit, and a throttle control unit. The electric generator is configured to be coupled to the engine. The throttle valve is configured to control an amount of intake air of the engine. The electric generator control unit is configured to allow the electric generator to perform regenerative power-generation on decelerated travel of the vehicle. The throttle control unit is configured to control the throttle valve openwise on the decelerated travel. The electric generator control unit is configured to cause an increase in power-generation torque of the electric generator, upon a switchover of the engine from a fuel cut state to a fuel injection state on the decelerated travel.

An aspect of the technology provides a control apparatus for a vehicle that includes an engine. The control apparatus includes an electric generator, a throttle valve, and circuitry. The electric generator is configured to be coupled to the engine. The throttle valve is configured to control an amount of intake air of the engine. The circuitry is configured to allow the electric generator to perform regenerative power-generation on decelerated travel of the vehicle. The circuitry is configured to control the throttle valve openwise on the decelerated travel. The circuitry is configured to cause an increase in power-generation torque of the electric generator, upon a switchover of the engine from a fuel cut state to a fuel injection state on the decelerated travel.

DETAILED DESCRIPTION

Figure 1:
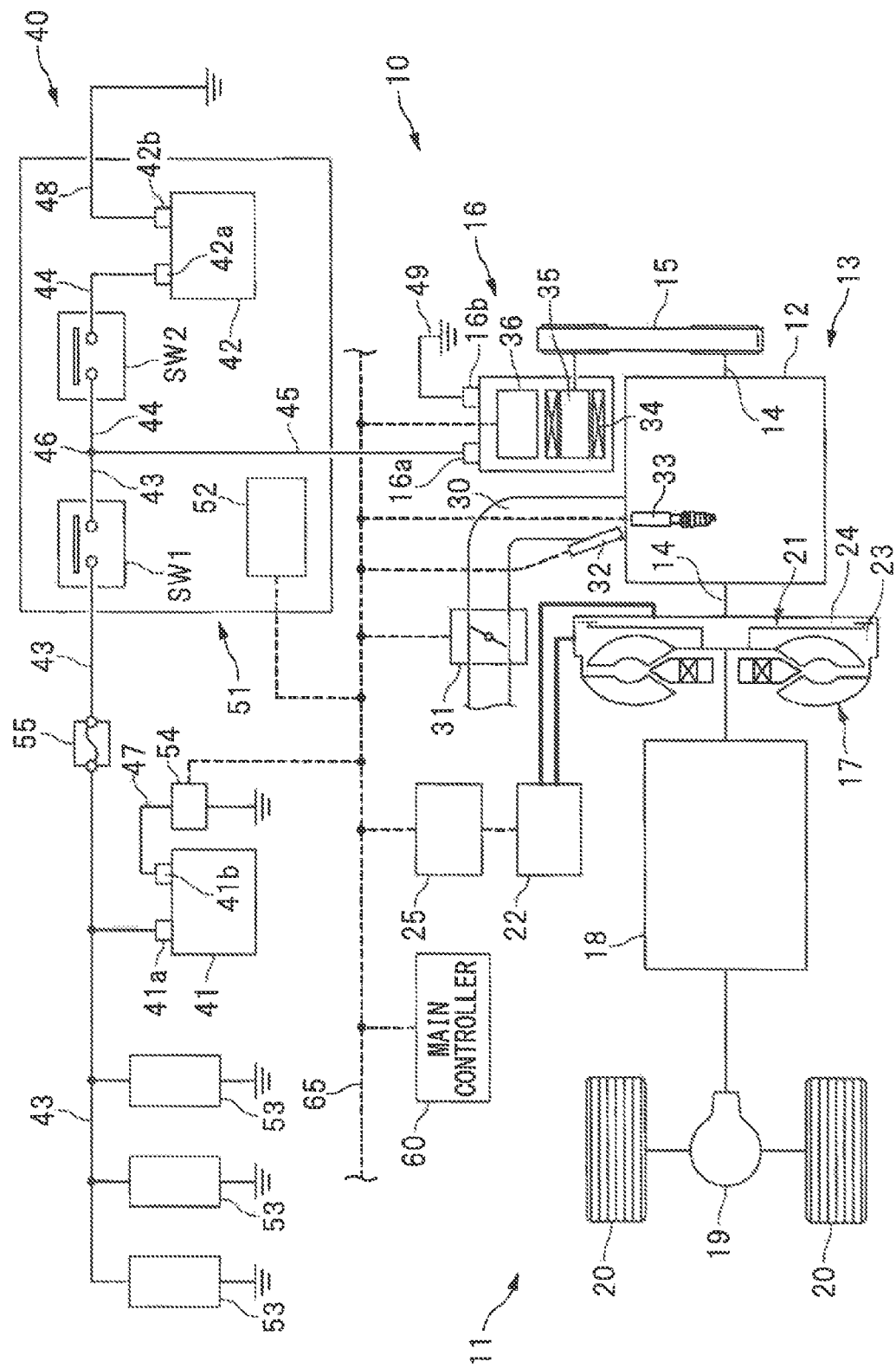
FIG. 1 schematically illustrates a vehicle provided with a control apparatus for a vehicle according to one implementation of the technology.

In the following, some implementations of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example implementations which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid redundant description.

With a throttle valve being open on a decelerated travel, an amount of intake air of an engine increases. In this state, a restart of fuel injection of the engine may cause possibility of an excessive output of engine torque. Such an excessive increase in the engine torque in accompaniment with the fuel injection may constitute a possible cause of a sense of incongruity given to an occupant. However, in an attempt to suppress the excessive increase in the engine torque in accompaniment with the fuel injection, simply closing the throttle valve on the decelerated travel to decrease the amount of the intake air would cause an increase in the engine load, and a decrease in the power-generated electric power on the decelerated travel. What is therefore desired is to get an adequate amount of the power-generated electric power on the decelerated travel, without giving the sense of incongruity to the occupant.

It is desirable to provide a control apparatus for a vehicle that makes it possible to get an adequate amount of power-generated electric power on decelerated travel, without giving a sense of incongruity to an occupant.

FIG. 1 is a schematic diagram illustrating a vehicle 11 provided with a control apparatus for a vehicle 10 according to an example implementation of the technology. Referring to FIG. 1, on the vehicle 11, a power unit 13 may be mounted. The power unit 13 may include an engine 12 that serves as an internal combustion engine. The engine 12 may include a crankshaft 14 to which a starter generator 16 is mechanically coupled via a belt mechanism 15. To the engine 12, a transmission mechanism 18 may also be coupled via a torque converter 17. To the transmission mechanism 18, wheels 20 may be coupled via, for example, a differential mechanism 19. In one implementation, the starter generator 16 may serve as an "electric generator".

The torque converter 17 may be coupled to the engine 12. In the torque converter 17, a lock up clutch 21 may be incorporated. In other words, to the engine 12, the lock up clutch 21 may be coupled. Controlling the lock up clutch 21 to an engaged state causes the engine 12 and the transmission mechanism 18 to be coupled via the lock up clutch 21. Controlling the lock up clutch 21 to a disengaged state causes the engine 12 and the transmission mechanism 18 to be coupled via the torque converter 17. To the torque converter 17, a valve unit 22 may be coupled. The valve unit 22 may include a plurality of solenoid valves and oil paths. Controlling oil pressures of an apply chamber 23 and a release chamber 24 with the use of the valve unit 22 causes the lock up clutch 21 to be controlled to the engaged state and to the disengaged state. Thus, the valve unit 22 may control the lock up clutch 21. The valve unit 22 may be controlled by a mission controller 25. The mission controller 25 may include, for example, a microcomputer.

The engine 12 may include an intake manifold 30. The intake manifold 30 may include a throttle valve 31 that controls an amount of intake air. Opening the throttle valve 31 makes it possible to increase the amount of the intake air of the engine 12. Closing the throttle valve 31 makes it possible to decrease the amount of the intake air of the engine 12. Moreover, the engine 12 may include an injector 32 that injects fuel into an intake port or a cylinder. Allowing the injector 32 to inject the fuel causes the engine 12 to be controlled to a fuel injection state. Stopping fuel injection from the injector 32 causes the engine 12 to be controlled to a fuel cut state. Furthermore, the engine 12 may include an ignition device 33 including an ignitor and an ignition coil. Allowing the ignition device 33 to control ignition timing makes it possible to control, for example, output torque of the engine 12 and a combustion temperature. It is to be noted that the throttle valve 31, the injector 32, and the ignition device 33 may be controlled by a main controller 60 described later.

The starter generator 16 is coupled to the engine 12. The starter generator 16 may be a so-called integrated starter generator (ISG) that serves both as an electric generator and an electric motor. The starter generator 16 may serve not only as the electric generator to be driven by the crankshaft 14 but also as the electric motor that causes rotation of the crankshaft 14. The starter generator 16 may be controlled to a powering state, for example, in restarting the engine 12 in an idling stop control, and in assisting the engine 12 in driving at the time of a start or acceleration.

The starter generator 16 may include a stator 34 having a stator coil and a rotor 35 having a field coil. The starter generator 16 may further include an ISG controller 36 in order to control an electrically conductive state of each of the stator coil and the field coil. The ISG controller 36 may include, for example, an inverter, a regulator, and a microcomputer. The ISG controller 36 may control the electrically conductive state of each of the field coil and the stator coil, thus controlling, for example, a power-generation voltage, power-generation torque, and powering torque of the starter generator 16.

[Power Supply Circuit]

Figure 2:
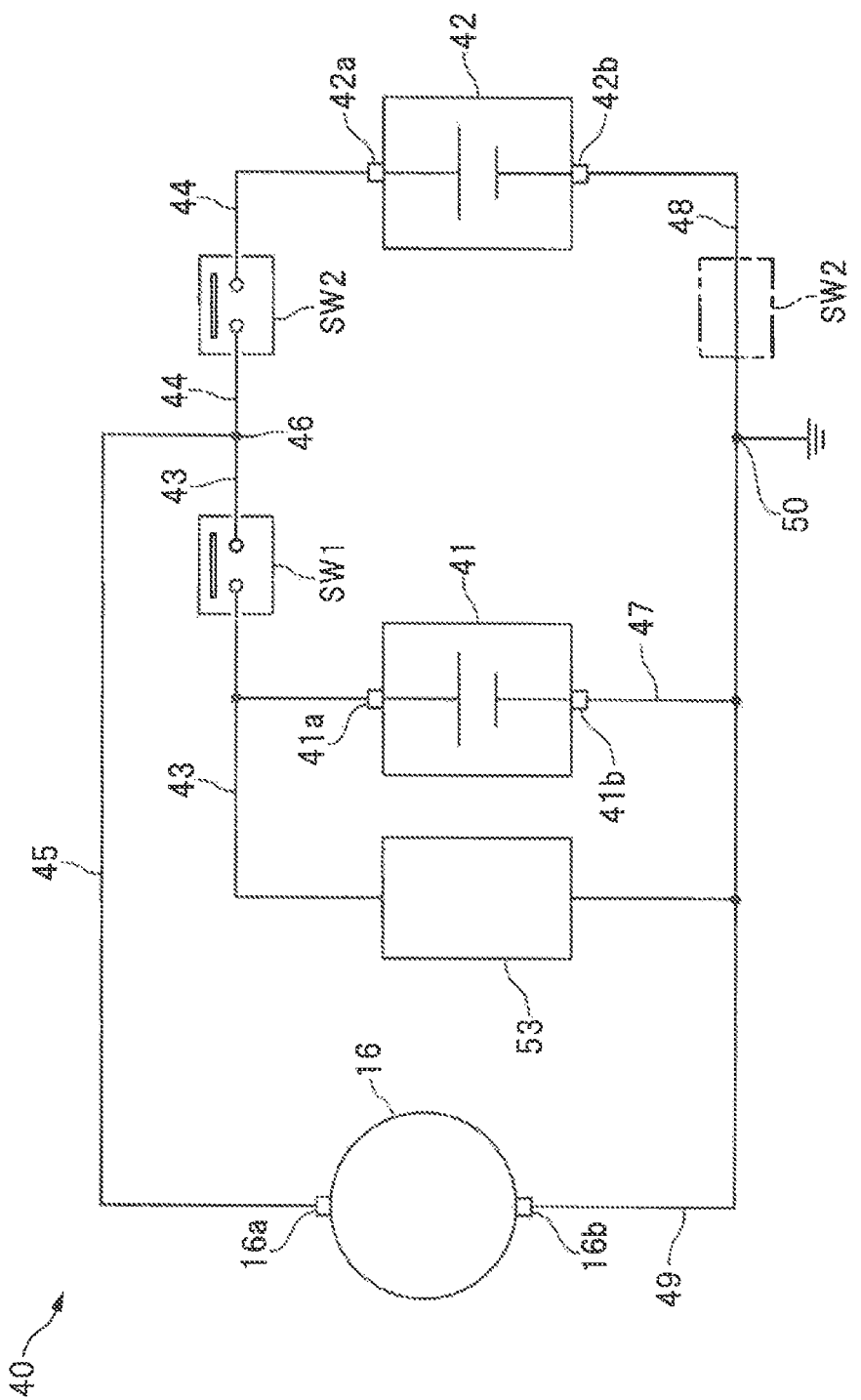
FIG. 2 is a circuit diagram illustrating an example of a power supply circuit.

A description is given of a power supply circuit 40 included in the control apparatus for the vehicle 10. FIG. 2 is a circuit diagram illustrating an example of the power supply circuit 40. Referring to FIG. 2, the power supply circuit 40 may include a lead battery 41 and a lithium-ion battery 42. The lead battery 41 may be electrically coupled to the starter generator 16. The lithium-ion battery 42 may be electrically coupled to the starter generator 16, in parallel to the lead battery 41. A terminal voltage of the lithium-ion battery 42 may be higher in design than a terminal voltage of the lead battery 41, in order to actively cause discharge of the lithium-ion battery 42. Further, internal resistance of the lithium-ion battery 42 may be smaller in design than internal resistance of the lead battery 41, in order to actively cause charge and the discharge of the lithium-ion battery 42. Thus, to the starter generator 16, coupled in parallel may be the lead battery 41 and the lithium-ion battery 42 that differ in the internal resistance from each other.

The lead battery 41 may include a positive electrode terminal 41a coupled to a positive electrode line 43. The lithium-ion battery 42 may include a positive electrode terminal 42a coupled to a positive electrode line 44. The starter generator 16 may include a positive electrode terminal 16a coupled to a positive electrode line 45. These positive electrode lines 43 to 45 may be coupled to one another via a node 46. The lead battery 41 may include a negative electrode terminal 41b coupled to a negative electrode line 47. The lithium-ion battery 42 may include a negative electrode terminal 42b coupled to a negative electrode line 48. The starter generator 16 may include a negative electrode terminal 16b coupled to a negative electrode line 49. These negative electrode lines 47 to 49 may be coupled to one another via a reference potential point 50.

On the positive electrode line 43 of the lead battery 41, a switch SW1 may be provided. The switch SW1 may be switched between an electrically conductive state and a cutoff state. Controlling the switch SW1 to the electrically conductive state causes the starter generator 16 and the lead battery 41 to be coupled to each other. Controlling the switch SW1 to the cutoff state causes the starter generator 16 and the lead battery 41 to be isolated from each other. Further, on the positive electrode line 44 of the lithium-ion battery 42, a switch SW2 may be provided. The switch SW2 may be switched between an electrically conductive state and a cutoff state. Controlling the switch SW2 to the electrically conductive state causes the starter generator 16 and the lithium-ion battery 42 to be coupled to each other. Controlling the switch SW2 to the cutoff state causes the starter generator 16 and the lithium-ion battery 42 to be isolated from each other.

The switch SW1 and the switch SW2 may each be configured by a semiconductor element such as, but not limited to, a metal-oxide-semiconductor field-effect transistor (MOSFET). In an alternative implementation, the switch SW1 and the switch SW2 may each be a switch that mechanically opens and closes a contact by means of, for example, electromagnetic force. It is to be noted that the switch SW1 and the switch SW2 are each referred to as, for example, a relay or a contactor as well.

As illustrated in FIG. 1, the power supply circuit 40 may include a battery module 51. In the battery module 51, incorporated may be the lithium-ion battery 42, and the switches SW1 and SW2. The battery module 51 may further include a battery controller 52. The battery controller 52 may include, for example, a microcomputer. The battery controller 52 may have a monitoring function and a control function. Non-limiting examples of the monitoring function may include monitoring of a state of charge SOC, charge and discharge currents, the terminal voltage, a cell temperature, and the internal resistance of the lithium-ion battery 42. Non-limiting examples of the control function may include controlling the switches SW1 and SW2. It is to be noted that the state of charge SOC refers to a ratio of an electricity storage amount of the battery to a designed capacity of the battery.

Moreover, to the positive electrode line 43 of the lead battery 41, a plurality of electric devices 53 may be coupled. On the negative electrode line 47 of the lead battery 41, a battery sensor 54 may be provided. The battery sensor 54 may have a detection function. Non-limiting examples of the detection function may include detection of a charge current, a discharge current, the terminal voltage, a state of charge SOC of the lead battery 41. It is to be noted that on the positive electrode line 43, a fuse 55 may be provided. The fuse 55 may protect, for example, the electric devices 53.

[Control System of Control Apparatus for Vehicle]

Figure 3:
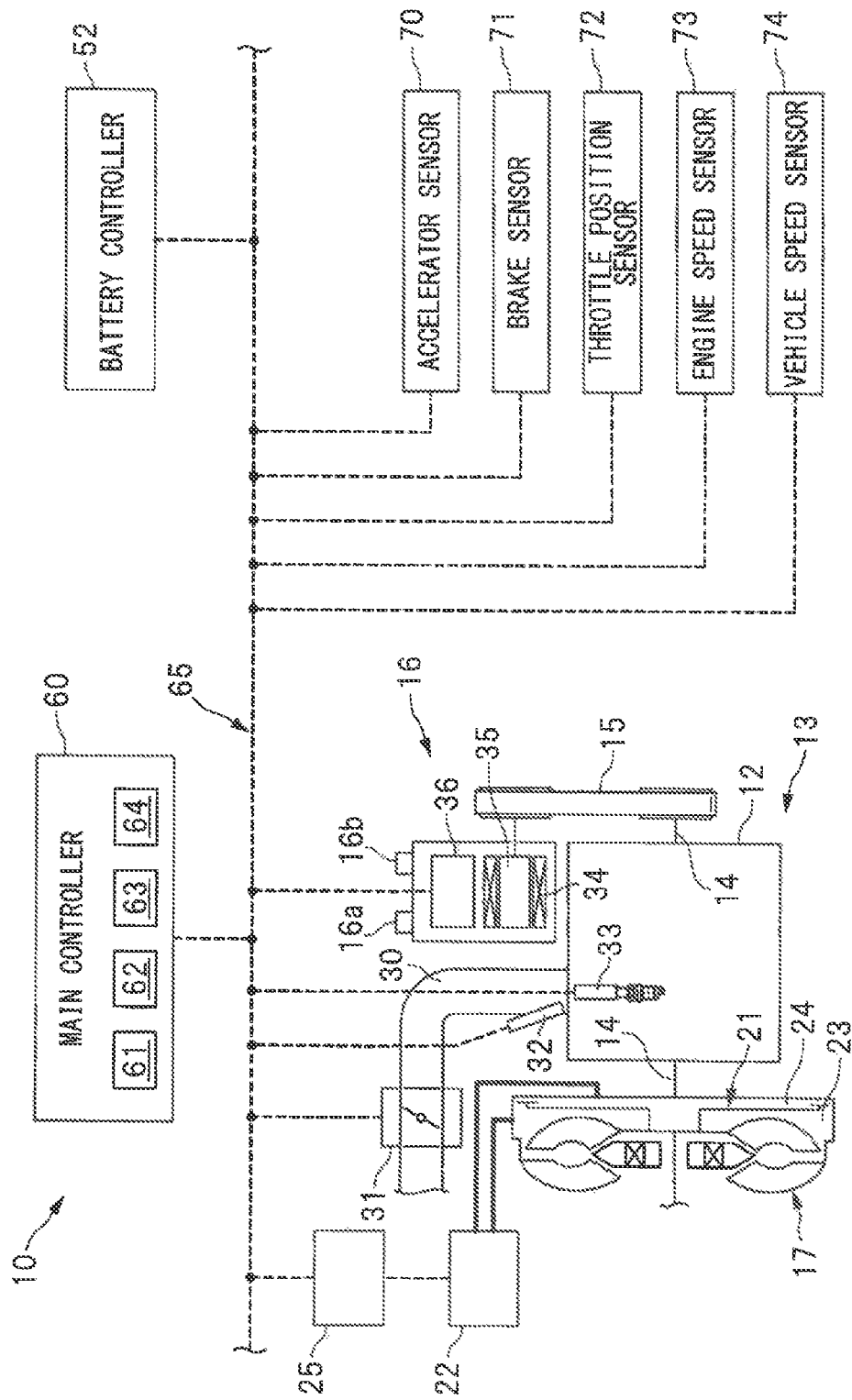
FIG. 3 schematically illustrates a control system of the control apparatus for the vehicle.

Described is a control system of the control apparatus for the vehicle 10. FIG. 3 is a schematic diagram of the control system of the control apparatus for the vehicle 10. Referring to FIGS. 1 and 3, the control apparatus for the vehicle 10 may include a main controller 60. The main controller 60 may control, for example, the starter generator 16, the throttle valve 31, the injector 32, and the ignition device 33. The main controller 60 may include, for example, a microcomputer. The main controller 60 may include functional units such as, but not limited to, an engine control unit 61, a throttle control unit 62, an electric generator control unit 63, and a clutch control unit 64. The engine control unit 61 may control, for example, the injector 32 and the ignition device 33. The throttle control unit 62 may control the throttle valve 31. The electric generator control unit 63 may control the starter generator 16. The clutch control unit 64 may control the lock up clutch 21.

The main controller 60, and the controllers 25, 36, and 52 as mentioned above may be so coupled to one another as to be able to perform a communication mutually and freely via an on-vehicle network 65. Non-limiting examples of the on-vehicle network 65 may include a controller area network (CAN) and a local interconnect network (LIN). The main controller 60 may control, for example, the starter generator 16, the throttle valve 31, the injector 32, and the ignition device 33, on the basis of information from various controllers and sensors. It is to be noted that the main controller 60 may output a control signal to the ISG controller 36, and thereby control, for example, the power-generation voltage and the power-generation torque of the starter generator 16. Moreover, the main controller 60 may output a control signal to the mission controller 25, and thereby control the lock up clutch 21 to the engaged state or the disengaged state.

As illustrated in FIG. 3, non-limiting examples of the sensors to be coupled to the main controller 60 may include an accelerator sensor 70, a brake sensor 71, a throttle position sensor 72, an engine speed sensor 73, and a vehicle speed sensor 74. The accelerator sensor 70 may detect an operation state of an accelerator pedal. The brake sensor 71 may detect an operation state of a brake pedal. The throttle position sensor 72 may detect a throttle plate position of the throttle valve 31. The engine speed sensor 73 may detect the number of rotations of the engine, i.e., a rotation speed of the engine 12. The vehicle speed sensor 74 may detect a vehicle speed, i.e., a travel speed of the vehicle 11. Moreover, the main controller 60 may be supplied, from the ISG controller 36, with information regarding, for example, the power-generation voltage and the power-generation torque of the starter generator 16. The main controller 60 may be supplied, from the mission controller 25, with information regarding, for example, an operation state of the lock up clutch 21. The main controller 60 may be supplied, from the battery controller 52, with information regarding, for example, the state of charge SOC of the lithium-ion battery 42.

[Power Supply States]

Figure 4:
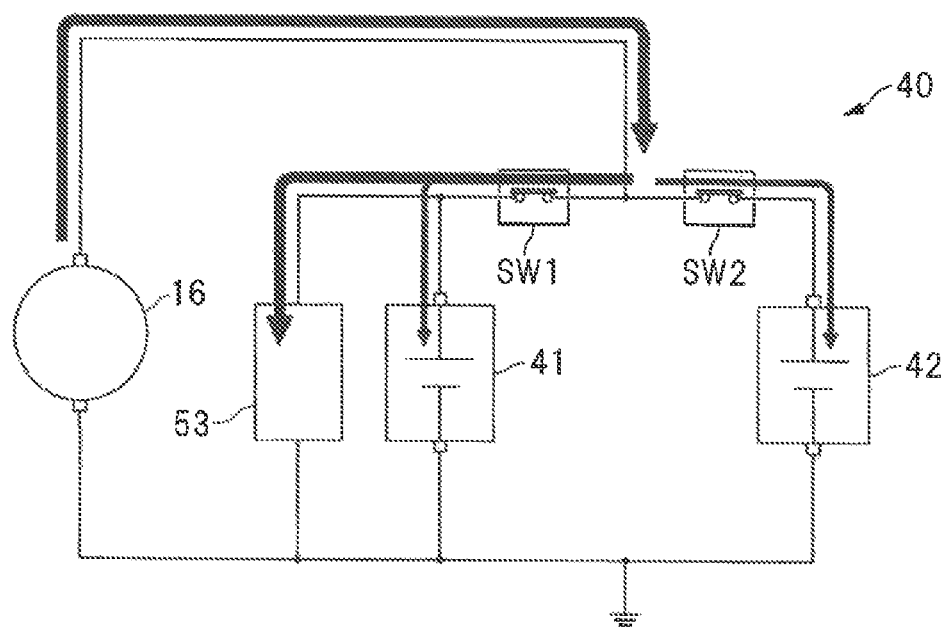
FIG. 4 describes an example of a power supply state, with a starter generator being controlled to a combustion power-generation state.
Figure 5:
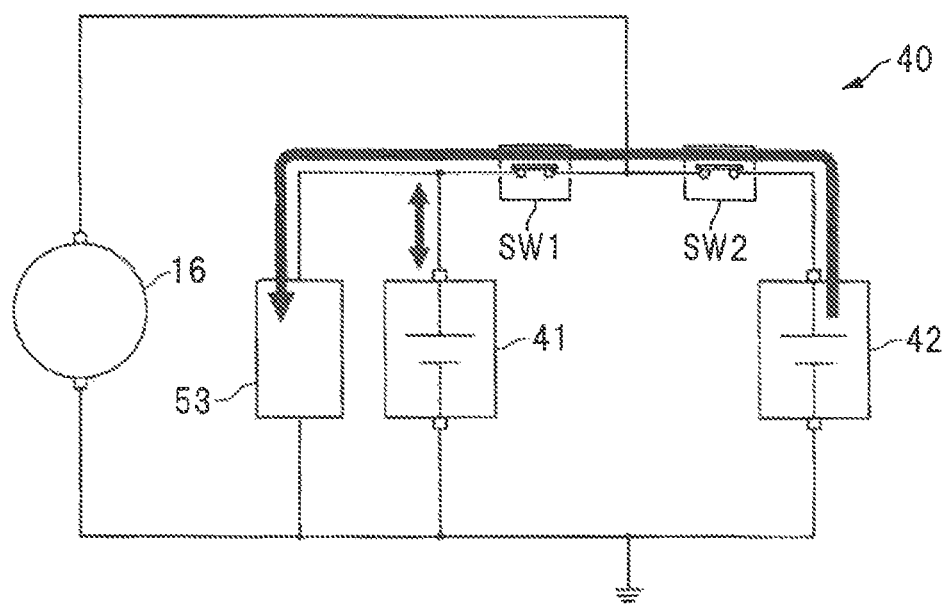
FIG. 5 describes an example of the power supply state, with the starter generator being controlled to a power-generation suspended state.
Figure 6:
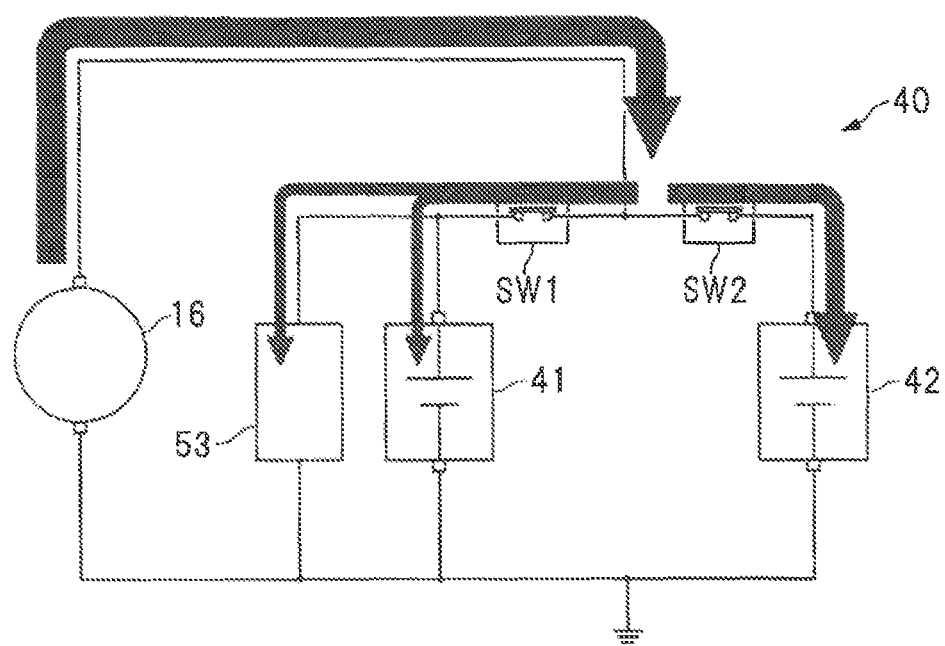
FIG. 6 describes an example of the power supply state, with the starter generator being controlled to a regenerative power-generation state.
Figure 7:
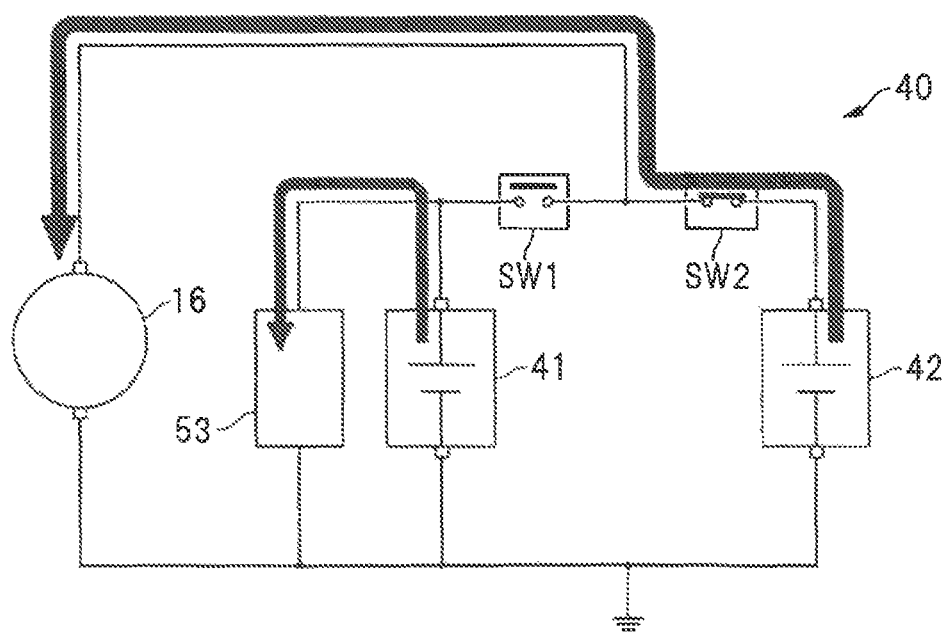
FIG. 7 describes an example of the power supply state, with the starter generator being controlled to a powering state.

A description is given of power supply states in accompaniment with a power-generation control and a powering control of the starter generator 16. FIG. 4 illustrates one example of the power supply state, with the starter generator 16 being controlled to a combustion power-generation state. FIG. 5 illustrates one example of the power supply state, with the starter generator 16 being controlled to a power-generation suspended state. FIG. 6 illustrates one example of the power supply state, with the starter generator 16 being controlled to a regenerative power-generation state. FIG. 7 illustrates one example of the power supply state, with the starter generator 16 being controlled to the powering state.

Referring to FIG. 4, in a case where an electricity storage amount of the lithium-ion battery 42 has lowered, the starter generator 16 may be controlled to the combustion power-generation state. In other words, in a case where the state of charge SOC of the lithium-ion battery 42 is lower than a predetermined lower limit, the starter generator 16 may be controlled to the combustion power-generation state, in order to charge the lithium-ion battery 42 and to increase the state of charge SOC. In controlling the starter generator 16 to the combustion power-generation state, the power-generation voltage of the starter generator 16 may be raised to a greater value than the terminal voltage of the lithium-ion battery 42. This causes the power-generated electric power to be supplied from the starter generator 16 to, for example, the lithium-ion battery 42, the electric devices 53, and the lead battery 41, as denoted by black arrows in FIG. 4. It is to be noted that the combustion power-generation state of the starter generator 16 means a state in which the starter generator 16 is driven by the engine 12, to generate electric power.

Referring to FIG. 5, in a case where the electricity storage amount of the lithium-ion battery 42 is sufficient, the starter generator 16 may be controlled to the power-generation suspended state. In other words, in a case where the state of charge SOC of the lithium-ion battery 42 is higher than a predetermined upper limit, the starter generator 16 may be controlled to the power-generation suspended state, in order to prompt the lithium-ion battery 42 to discharge, and to reduce an engine load. In controlling the starter generator 16 to the power-generation suspended state, the power-generation voltage of the starter generator 16 may be lowered to a smaller value than the terminal voltage of the lithium-ion battery 42. This causes electric power to be supplied from the lithium-ion battery 42 to, for example, the electric devices 53, as denoted by a black arrow in FIG. 5. Hence, it is possible to suppress or stop power generation of the starter generator 16, and to reduce the engine load.

As mentioned above, the main controller 60 may control the starter generator 16 to the combustion power-generation state or the power-generation suspended state on the basis of the state of charge SOC. Meanwhile, on decelerated travel, it is necessary to recover much kinetic energy, and to enhance fuel consumption performance. Therefore, on the decelerated travel, the starter generator 16 may be controlled to the regenerative power-generation state, and the power-generation voltage of the starter generator 16 may be raised within a range in which the power-generation voltage of the starter generator 16 is not higher than withstanding voltages of, for example, the batteries 41 and 42, and the electric devices 53. This makes it possible to increase the power-generated electric power of the starter generator 16. It is therefore possible to actively convert the kinetic energy to electric energy, and recover the electric energy, leading to enhancement in energy efficiency of the vehicle 11 and enhancement in the fuel consumption performance.

As described above, whether or not to control the starter generator 16 to the regenerative power-generation state may be determined on the basis of, for example, the operation states of the accelerator pedal and the brake pedal. Specifically, in coasting, stepping down of the accelerator or the brake pedal is released. In braking of the vehicle, the brake pedal is stepped down. In these cases, a fuel cut of the engine 12 may be exerted, resulting in deceleration of the vehicle 11, i.e., discharge of much kinetic energy from the vehicle 11. Thus, the starter generator 16 may be controlled to the regenerative power-generation state. In contrast, on accelerated travel or on steady travel, the accelerator pedal is stepped down. In this case, the fuel injection of the engine 12 may be exerted. Thus, the starter generator 16 may be controlled to the combustion power-generation state or the power-generation suspended state.

In controlling the starter generator 16 to the regenerative power-generation state, the power-generation voltage of the starter generator 16 may be raised within the range in which the power-generation voltage of the starter generator 16 is not higher than the withstanding voltages of, for example, the batteries 41 and 42, and the electric devices 53. This causes a large current to be supplied from the starter generator 16 to the lithium-ion battery 42 and the lead battery 41, as denoted by black arrows in FIG. 6, making it possible to rapidly charge the lithium-ion battery 42 and the lead battery 41. It is to be noted that because the internal resistance of the lithium-ion battery 42 is smaller than the internal resistance of the lead battery 41, most of the power-generated current is supplied to the lithium-ion battery 42.

As illustrated in FIGS. 4 to 6, in controlling the starter generator 16 to the combustion power-generation state, the regenerative power-generation state, and the power-generation suspended state, the switches SW1 and SW2 may be maintained in the electrically conductive state. In other words, in the control apparatus for the vehicle 10, it is possible to control the charge and the discharge of the lithium-ion battery 42, without making a switching control of the switches SW1 and SW2, solely by controlling the power-generation voltage of the starter generator 16. It is therefore possible to easily control the charge and the discharge of the lithium-ion battery 42, leading to enhance durability of the switches SW1 and SW2.

Moreover, as illustrated in FIG. 7, in controlling the starter generator 16 to the powering state, the switch SW1 may be switched from the electrically conductive state to the cutoff state. In other words, the switch SW1 may be switched from the electrically conductive state to the cutoff state, in a case where the starter generator 16 causes the engine 12 to start and rotate, and in a case where the starter generator 16 assists the engine 12 in driving. This makes it possible to prevent an instantaneous voltage drop with respect to, for example, the electric devices 53, even in a case with a supply of a large current from the lithium-ion battery 42 to the starter generator 16. It is therefore possible to allow, for example, the electric devices 53 to function normally.

[Decelerated Travel Control]

Figure 8:
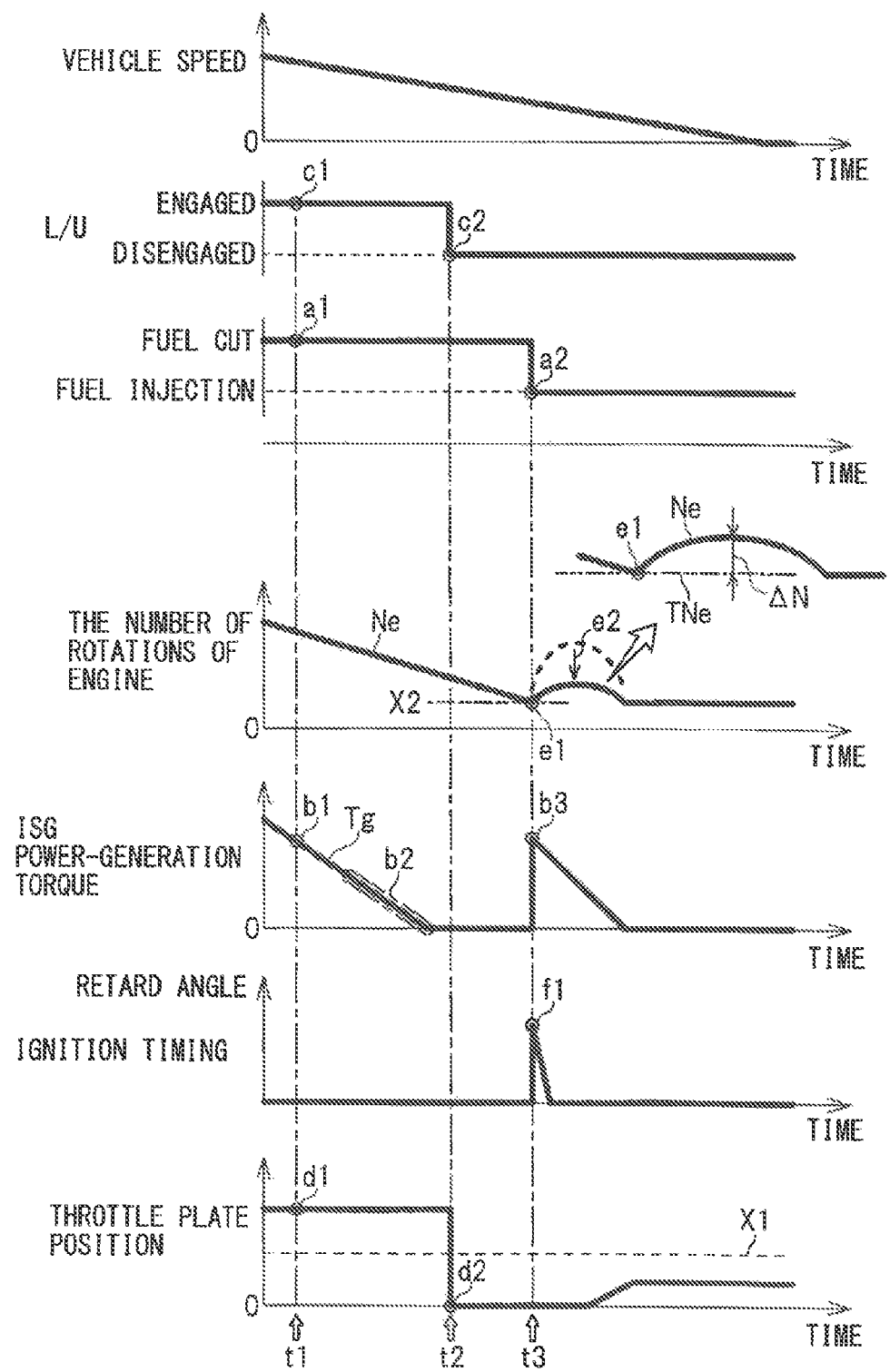
FIG. 8 is a timing chart illustrating an example of operation states of various devices in a decelerated travel control.

A description is given of a decelerated travel control to be executed by the main controller 60. FIG. 8 is a timing chart illustrating one example of operation states of various devices in the decelerated travel control. The decelerated travel as illustrated in FIG. 8 may be the coasting in which the stepping down of the accelerator pedal and the brake pedal is released. In FIG. 8, reference characters "L/U" means the lock up clutch 21. Reference characters "ISG" means the starter generator 16. Reference characters "Ne" means the number of rotations of the engine. Reference characters "Tg" means the power-generation torque of the starter generator 16. In the following description, the term "openwise" of the throttle valve 31 means a direction in which the throttle plate position becomes larger than a predetermined value X1, while the term "closewise" of the throttle valve 31 means a direction in which the throttle plate position becomes smaller than the predetermined value X1.

At time t1 illustrated in FIG. 8, in the coasting in which the stepping down of the accelerator pedal is released, the engine 12 may be controlled to the fuel cut state (reference characters a1). The starter generator 16 may be controlled to the regenerative power-generation state (reference characters b1). The lock up clutch 21 may be controlled to the engaged state (reference characters c1). Thus, in the coasting in which regenerative power-generation is exerted, the lock up clutch 21 may be controlled to the engaged state. This makes it possible to efficiently transmit rotational power from the wheels 20 to the starter generator 16. It is therefore possible to enhance regenerative torque, i.e., the power-generation torque Tg, of the starter generator 16, and to increase the power-generated electric power in the coasting.

Moreover, at the time t1 illustrated in FIG. 8, in the coasting in which the regenerative power-generation is made, the throttle valve 31 may be controlled openwise (reference characters d1). Thus, controlling the throttle valve 31 openwise makes it possible to increase the amount of the intake air of the engine 12, and to reduce the pumping loss of the engine 12. This leads to reduction in the number of executions of engine braking in the coasting. It is therefore possible to increase the power-generation torque Tg without an excessive increase in the vehicle deceleration, and to increase the power-generated electric power in the coasting without giving an occupant a sense of incongruity. It is to be noted that as denoted by reference characters b2, in allowing the starter generator 16 to perform the regenerative power-generation, the power-generation torque Tg may be gradually lowered in accordance with a decrease in the vehicle speed, in order to keep the vehicle deceleration from increasing excessively. Moreover, in controlling the throttle valve 31 openwise, a negative pressure inside the intake manifold 30 decreases. Accordingly, the throttle plate position may be so adjusted as to prevent shortage of a negative pressure of, for example, an undepicted vacuum booster.

Thereafter, at time t2 illustrated in FIG. 8, upon the lock up clutch 21 being switched from the engaged state to the disengaged state (reference characters c2), the throttle valve 31 may be controlled from openwise to closewise (reference characters d2). It is to be noted that in the illustrated example, in controlling the throttle valve 31 closewise, the throttle valve 31 is closed to a fully closed position. However, this is non-limiting. The throttle valve 31 may be open within a range in which the throttle plate position is smaller than the predetermined value X1. Non-limiting examples of conditions on which the lock up clutch 21 is disengaged on the decelerated travel may include that the vehicle speed is lower than a predetermined value, that the vehicle deceleration is higher than a predetermined value, and that the number of rotations of the engine is smaller than a predetermined value. However, these example conditions are non-limiting.

Thereafter, at time t3 illustrated in FIG. 8, upon the number of rotations of the engine Ne reaching a predetermined lower limit X2 (reference characters e1), the fuel injection into the engine 12 may be restarted (reference characters a2), from viewpoint of prevention of engine stall. In other words, in a case where the number of rotations of the engine Ne has lowered to reach the lower limit X2, the engine 12 may be switched from the fuel cut state to the fuel injection state. The restart of the fuel injection into the engine 12 causes the engine torque to be outputted to be directed toward acceleration of the vehicle 11. This contributes to a decrease in the vehicle deceleration, resulting in the possibility of the sense of incongruity given to the occupant. Therefore, as denoted by reference characters b3, in switching the engine 12 to the fuel injection state, the power-generation torque Tg of the starter generator 16 is increased. This makes it possible to allow the power-generation torque Tg that is outputted to be directed toward deceleration to cancel out the engine torque that is outputted to be directed toward the acceleration. It is therefore possible to suppress excessive variations in the vehicle deceleration, and to restart the fuel injection, without giving the occupant the sense of incongruity. In other words, as denoted by an arrow e2, increasing the power-generation torque Tg of the starter generator 16 makes it possible to suppress racing of the number of rotations of the engine Ne in accompaniment with the restart of the fuel injection.

Here, the power-generation torque Tg to be outputted in order to cancel out the engine torque may be controlled on the basis of the number of rotations of the engine Ne, i.e., the rotation speed of the engine 12. In other words, as illustrated in an enlarged part of FIG. 8, target torque of the starter generator 16 may be set, by multiplying a difference in the number of rotations ΔN by a predetermined gain. The difference in the number of rotations ΔN is a difference between predetermined target number of rotations TNe and the number of rotations of the engine Ne. The power-generation torque Tg of the starter generator 16 may be so controlled toward the target torque as to allow the number of rotations of the engine Ne to converge on the target number of rotations TNe. It is to be noted that in the forgoing description, the power-generation torque Tg is controlled by proportional action that is proportional to the difference in the number of rotations ΔN, i.e., a deviation. However, this is non-limiting. The power-generation torque Tg may be controlled by combining the proportional action and derivative action, or alternatively, the power-generation torque Tg may be controlled by combining the proportional action, the derivative action, and integral action. Moreover, the power supply circuit 40 may include not only the lead battery 41 but also the lithium-ion battery 42 having the small internal resistance. This makes it possible to sufficiently accept the power-generated current of the starter generator 16, and to appropriately raise the power-generation torque Tg of the starter generator 16.

Moreover, at the restart of the fuel injection into the engine 12, as denoted by reference characters f1, an ignition retard control, i.e., an ignition retard angle control, may be executed. The ignition retard control may include retarding the ignition timing of the engine 12. This allows for further reduction in the engine torque, leading to suppression of the excessive variations in the vehicle deceleration. Moreover, upon the disengagement of the lock up clutch 21, as denoted by reference characters d2, the throttle valve 31 may be controlled closewise. This makes it possible to reduce the amount of the intake air of the engine 12, in preparation for the restart of the fuel injection. It is therefore possible to reduce the engine torque to be outputted by the fuel injection, allowing for the restart of the fuel injection, without giving the sense of incongruity to the occupant.

As described so far, the power-generation torque Tg of the starter generator 16 is raised, in the case with a switchover of the engine 12 from the fuel cut state to the fuel injection state on the decelerated travel. This makes it possible to allow the power-generation torque Tg that is outputted to be directed toward the deceleration to cancel out the engine torque that is outputted to be directed toward the acceleration. It is therefore possible to suppress the excessive variations in the vehicle deceleration. Thus, increasing the power-generation torque Tg makes it possible to suppress the excessive variations in the vehicle deceleration. Hence, it is possible to restart the fuel injection, without giving the occupant the sense of incongruity caused by the increase in the power-generation torque Tg, even in the case where the throttle valve 31 has been controlled openwise on the decelerated travel from viewpoint of getting an adequate amount of the power-generated electric power. In other words, it is possible to get the adequate amount of the power-generated electric power on the decelerated travel, without giving the sense of incongruity to the occupant.

[First Example of Increase in Power-Generation Torque]

Figure 9:
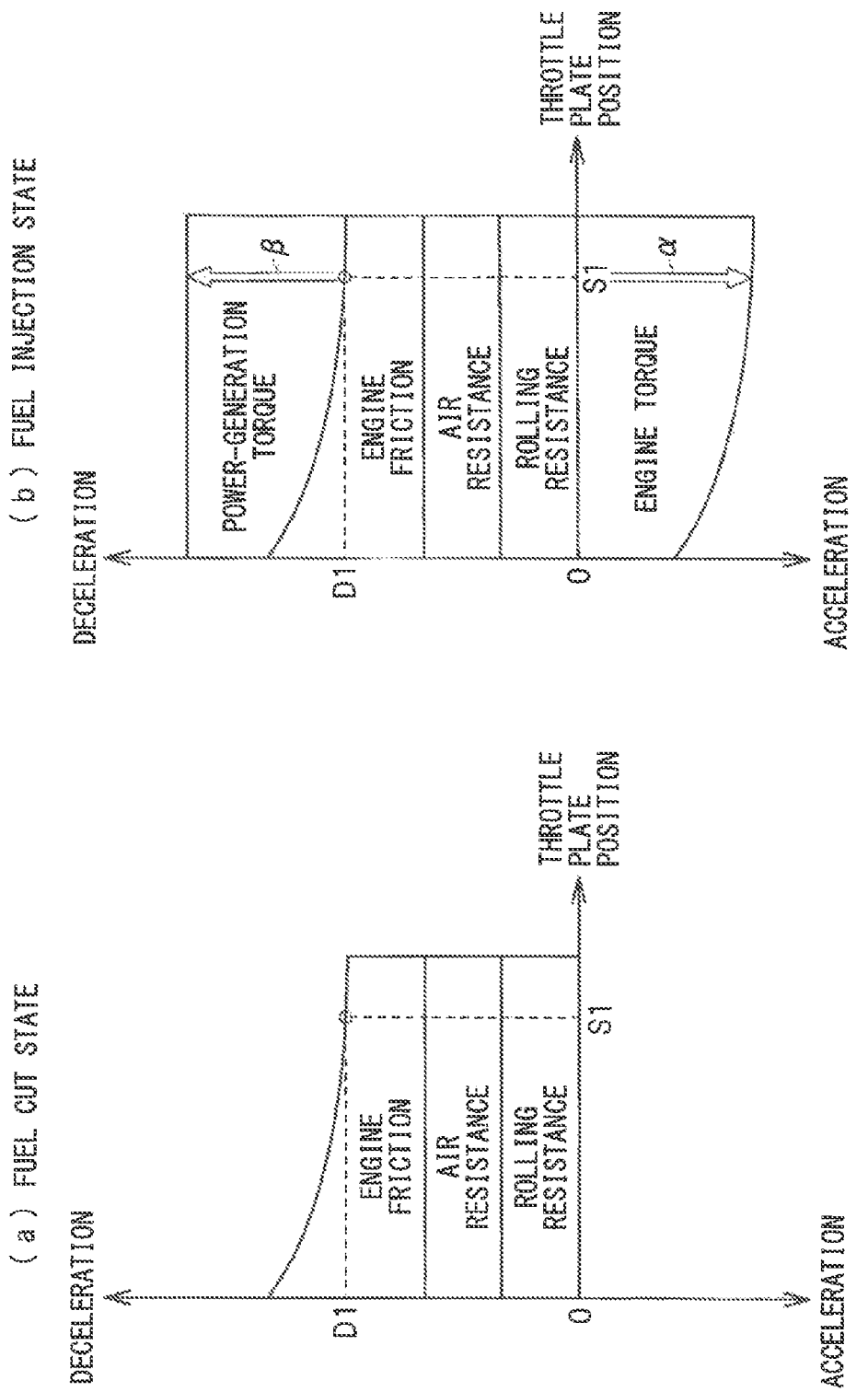
FIG. 9 schematically illustrates details of vehicle deceleration and vehicle acceleration.

As described, the power-generation torque of the starter generator 16 is increased in the case with the switchover of the engine 12 from the fuel cut state to the fuel injection state, in order to suppress the excessive variations in the vehicle deceleration. In the following, a description is given of an amount of the increase in the power-generation torque in accompaniment with the switchover of the engine 12 to the fuel injection state. Parts (a) and (b) of FIG. 9 schematically illustrate details of the vehicle deceleration and the vehicle acceleration. The part (a) of FIG. 9 illustrates the vehicle deceleration and the vehicle acceleration in the fuel cut state. The part (b) of FIG. 9 illustrates the vehicle deceleration and the vehicle acceleration in the fuel injection state. It is to be noted that the parts (a) and (b) of FIG. 9 illustrate the vehicle deceleration and the vehicle acceleration at a predetermined vehicle speed in the coasting.

As illustrated in the part (a) of FIG. 9, on the vehicle 11 in the coasting, the following items act, as the vehicle deceleration: deceleration by rolling resistance, deceleration by air resistance, and deceleration by engine friction. The engine friction, i.e., rotational resistance of the engine, is a resistance value that increases and decreases in accordance with the throttle plate position. Specifically, in a case with an increase in the throttle plate position, the pumping loss of the engine 12 decreases, causing the engine friction to be smaller. In a case with a decrease in the throttle plate position, the pumping loss of the engine 12 increases, causing the engine friction to be greater. In other words, in a case where the throttle plate position is S1, the vehicle 11 coasts, while decelerating at deceleration D1. It is to be noted that in the example illustrated in the part (a) of FIG. 9, the vehicle acceleration is zero (0) because the engine 12 is in the fuel cut state.

Thereafter, as illustrated in the part (b) of FIG. 9, upon the switchover of the engine 12 from the fuel cut state to the fuel injection state, acceleration a by the engine torque acts on the vehicle 11. The acceleration a generated in accompaniment with the switchover of the engine 12 to the fuel injection state is one cause of a significant decrease in the vehicle deceleration from the deceleration D1. Therefore, the power-generation torque of the starter generator 16 is so increased as to cancel out the acceleration a. This makes it possible to allow deceleration 13 by the power-generation torque of the starter generator 16 to act on the vehicle 11, and to allow the deceleration 13 to cancel out the acceleration a. In other words, as illustrated in the parts (a) and (b) of FIG. 9, it is possible to keep the vehicle deceleration near, for example, the deceleration D1, without the excessive variations in the vehicle deceleration, even in the case with the switchover of the engine 12 from the fuel cut state to the fuel injection state. Hence, it is possible to allow the vehicle 11 to travel, without giving the occupant the sense of incongruity.

[Second Example of Increase in Power-Generation Torque]

Figure 10:
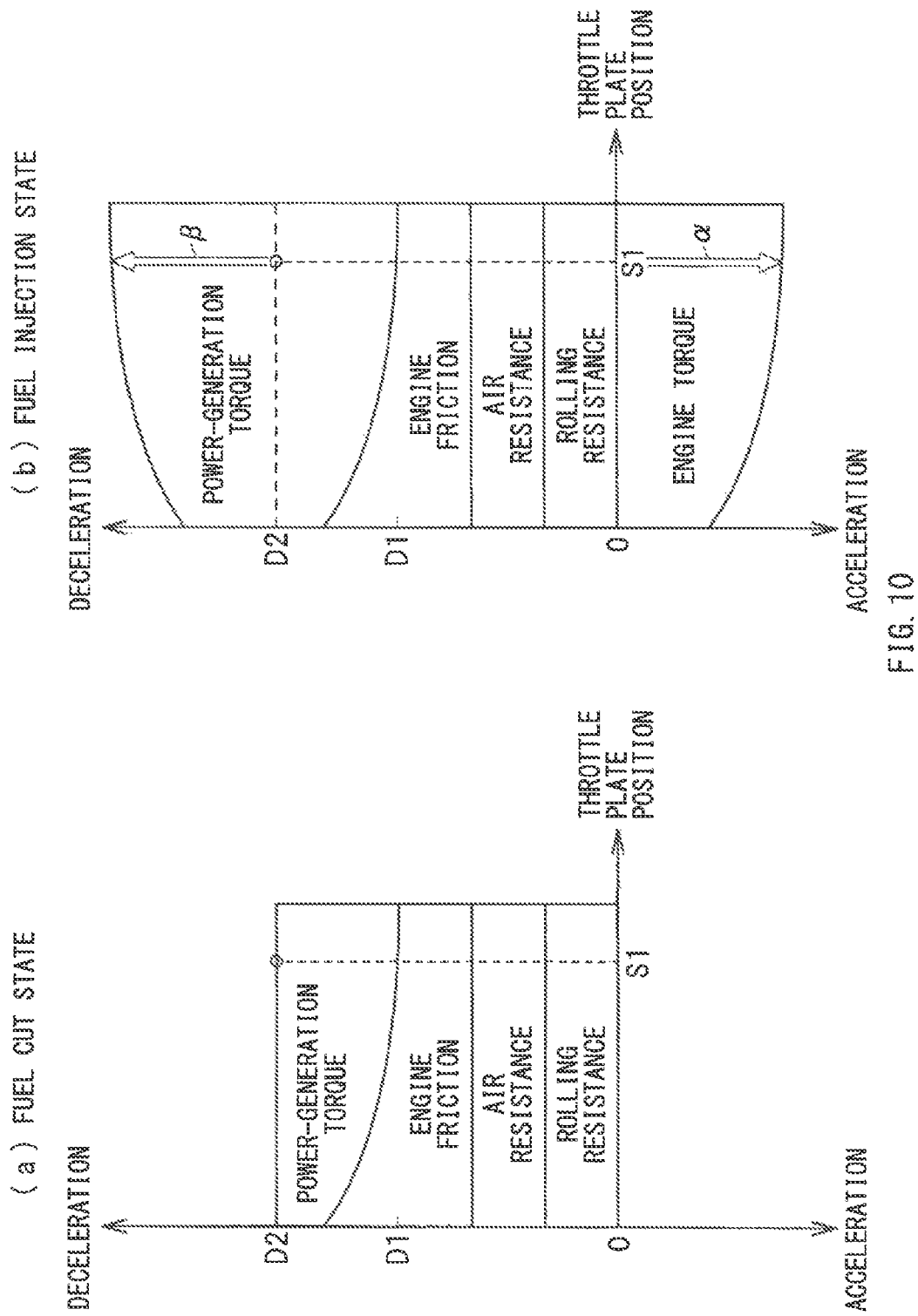
FIG. 10 schematically illustrates the details of the vehicle deceleration and the vehicle acceleration.

In the example illustrated in the parts (a) and (b) of FIG. 9, the switchover of the engine 12 from the fuel cut state to the fuel injection state is made, with the power generation of the starter generator 16 being stopped. However, this is non-limiting. The switchover of the engine 12 from the fuel cut state to the fuel injection state may be made, with the starter generator 16 generating electric power. Parts (a) and (b) of FIG. 10 schematically illustrate the details of the vehicle deceleration and the vehicle acceleration. The part (a) of FIG. 10 illustrates the vehicle deceleration and the vehicle acceleration in the fuel cut state. The part (b) of FIG. 10 illustrates the vehicle deceleration and the vehicle acceleration in the fuel injection state. It is to be noted that the parts (a) and (b) of FIG. 10 illustrate the vehicle deceleration and the vehicle acceleration at the predetermined vehicle speed in the coasting.

As illustrated in the part (a) of FIG. 10, on the vehicle 11 in the coasting, the following items act, as the vehicle deceleration: the deceleration by the rolling resistance, the deceleration by the air resistance, the deceleration by the engine friction, and deceleration by the power-generation torque of the starter generator 16. The engine friction, i.e., the rotational resistance of the engine, is the resistance value that increases and decreases in accordance with the throttle plate position. Specifically, in the case with the increase in the throttle plate position, the pumping loss of the engine 12 decreases, causing the engine friction to be smaller. In the case with the decrease in the throttle plate position, the pumping loss of the engine 12 increases, causing the engine friction to be greater. In other words, in the case where the throttle plate position is S1, the vehicle 11 coasts, while decelerating at deceleration D2. It is to be noted that in the example illustrated in the part (a) of FIG. 10, the vehicle acceleration is zero (0) because the engine 12 is in the fuel cut state.

Thereafter, as illustrated in the part (b) of FIG. 10, upon the switchover of the engine 12 from the fuel cut state to the fuel injection state, the acceleration a by the engine torque acts on the vehicle 11. The acceleration a generated in accompaniment with the switchover of the engine 12 to the fuel injection state is one cause of the significant decrease in the vehicle deceleration from the deceleration D2. Therefore, the power-generation torque of the starter generator 16 is so increased as to cancel out the acceleration a. This makes it possible to allow the deceleration 13 by the power-generation torque of the starter generator 16 to act on the vehicle 11, and to allow the deceleration 13 to cancel out the acceleration a. In other words, as illustrated in the parts (a) and (b) of FIG. 10, it is possible to keep the vehicle deceleration near, for example, the deceleration D2, without the excessive variations in the vehicle deceleration, even in the case with the switchover of the engine 12 from the fuel cut state to the fuel injection state. Hence, it is possible to allow the vehicle 11 to travel, without giving the occupant the sense of incongruity.

[Decelerated Travel Control (Other Implementations)]

Figure 11:
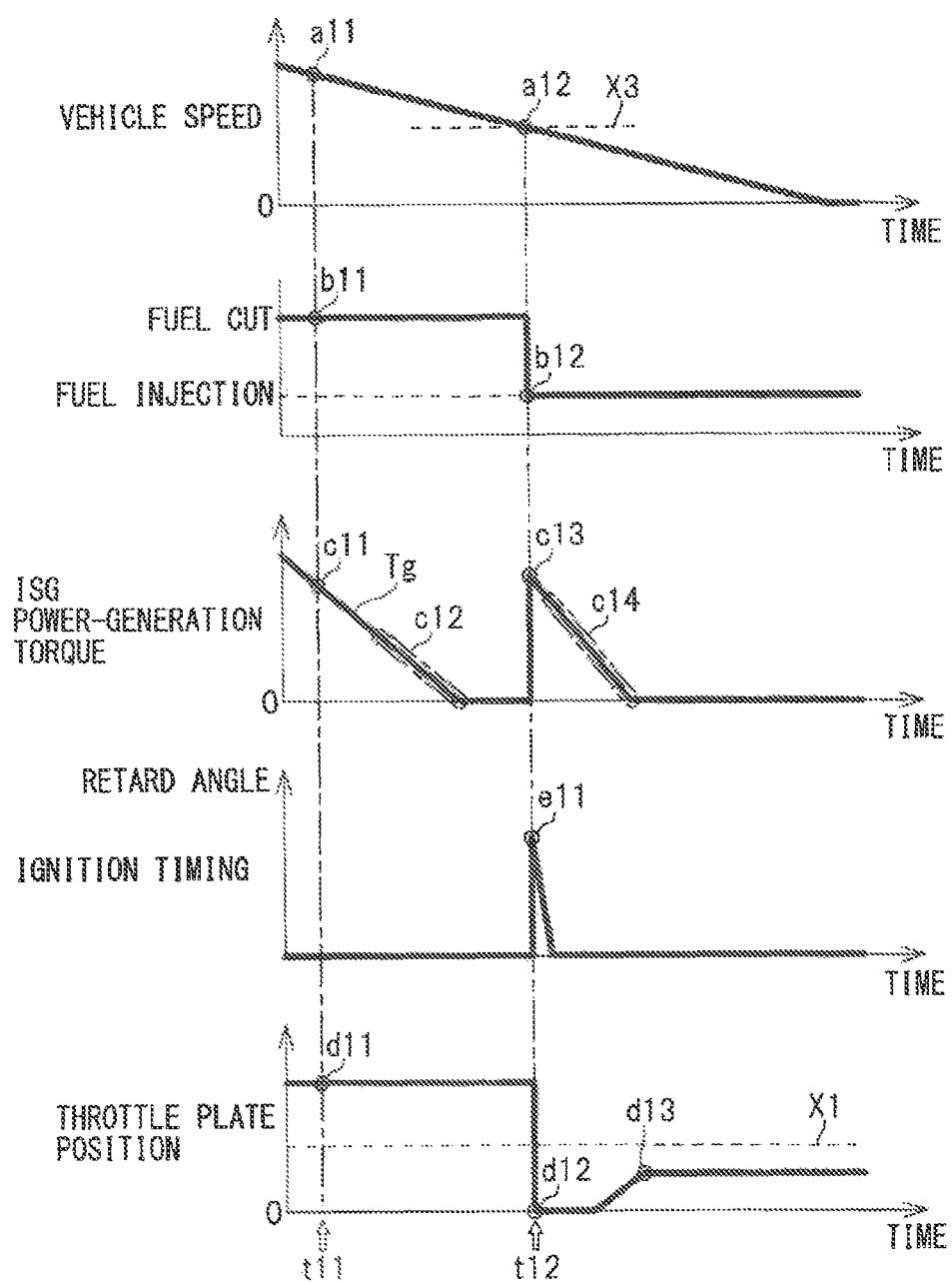
FIG. 11 is a timing chart illustrating an example of the operation states of the various devices in the decelerated travel control.

Description now moves on to another example of the decelerated travel control to be executed by the main controller 60. FIG. 11 is a timing chart illustrating one example of the operation states of the various devices in the decelerated travel control. The decelerated travel as illustrated in FIG. 11 may be the coasting in which the stepping down of the accelerator pedal and the brake pedal is released. In FIG. 11, the reference characters "ISG" means the starter generator 16. The reference characters "Tg" means the power-generation torque of the starter generator 16. In the following description, the term "openwise" of the throttle valve 31 means the direction in which the throttle plate position becomes larger than the predetermined value X1, while the term "closewise" of the throttle valve 31 means the direction in which the throttle plate position becomes smaller than the predetermined value X1.

At time t11 illustrated in FIG. 11, in the coasting in a region in which the vehicle speed is higher than a predetermined threshold X3 (reference characters a11), the engine 12 may be controlled to the fuel cut state (reference characters b11). The starter generator 16 may be controlled to the regenerative power-generation state (reference characters d11). Moreover, in the coasting in the region in which the vehicle speed is higher than the predetermined threshold X3, the throttle valve 31 may be controlled openwise (reference characters d11). It is to be noted that in controlling the throttle valve 31 openwise, the negative pressure inside the intake manifold 30 decreases. Accordingly, the throttle plate position may be so adjusted as to prevent the shortage of the negative pressure of, for example, the undepicted vacuum booster.

As mentioned above, in allowing the starter generator 16 to perform the regenerative power-generation, controlling the throttle valve 31 openwise makes it possible to increase the amount of the intake air of the engine 12, and to reduce the pumping loss of the engine 12. This leads to the reduction in the number of the executions of the engine braking in the coasting. It is therefore possible to increase the power-generation torque Tg without the excessive increase in the vehicle deceleration, and to increase the power-generated electric power in the coasting, without giving the occupant the sense of incongruity. It is to be noted that as denoted by reference characters c12, in allowing the starter generator 16 to perform the regenerative power-generation, the power-generation torque Tg may be gradually lowered in accordance with the decrease in the vehicle speed, in order to keep the vehicle deceleration from increasing excessively.

Thereafter, at time t12 illustrated in FIG. 11, upon the vehicle speed being lower than the predetermined threshold X3 (reference characters a12), the engine 12 may be controlled to the fuel injection state (reference characters b12). Moreover, upon a restart of fuel supply to the engine 12, the vehicle deceleration decreases because of the engine torque that is outputted to be directed toward the acceleration. Accordingly, the throttle valve 31 may be controlled closewise (reference characters d12). Thus, closing the throttle valve 31 to decrease the amount of the intake air causes reduction in an output of the engine torque, and thereby causes suppression of the decrease in the vehicle deceleration. However, because it takes time for the amount of the intake air to decrease sufficiently, it is likely that the engine torque is outputted immediately after the restart of the fuel injection. This causes the decrease in the vehicle deceleration, resulting in the possibility of the sense of incongruity given to the occupant.

Therefore, as denoted by reference characters c13, at the restart of the fuel injection into the engine 12, the power-generation torque Tg of the starter generator 16 is increased. This makes it possible to allow the power-generation torque Tg that is outputted to be directed toward the deceleration to cancel out the engine torque that is outputted to be directed toward the acceleration. It is therefore possible to suppress the excessive variations in the vehicle deceleration, and to restart the fuel injection, without giving the occupant the sense of incongruity. It is to be noted that the power supply circuit 40 may include not only the lead battery 41 but also the lithium-ion battery 42 having the small internal resistance. This makes it possible to sufficiently accept the power-generated current of the starter generator 16, and to appropriately raise the power-generation torque Tg of the starter generator 16. Moreover, as denoted by reference characters c14, in allowing the starter generator 16 to perform the regenerative power-generation, the power-generation torque Tg may be gradually lowered in accordance with the decrease in the vehicle speed, in order to keep the vehicle deceleration from increasing excessively.

As denoted by reference characters e11 in FIG. 11, at the restart of the fuel injection into the engine 12, the ignition retard control, i.e., the ignition retard angle control, may be executed. The ignition retard control may include retarding the ignition timing of the engine 12. This allows for the further reduction in the engine torque, leading to the suppression of the excessive variations in the vehicle deceleration. Moreover, as denoted by reference characters d12, immediately after the restart of the fuel injection into the engine 12, the throttle valve 31 may be closed to the fully closed position, in order to decrease the amount of the intake air to reduce the engine torque. Thereafter, the throttle valve 31 may be controlled to a predetermined throttle plate position (reference characters d13), in order to maintain an idling state of the engine 12. It is to be noted that in the illustrated example, the engine 12 is maintained at the idling state after a stop of the vehicle, but this is non-limiting. Alternatively, the engine 12 may be stopped by an idling stop control.

As described so far, the power-generation torque Tg of the starter generator 16 is raised, in the case with the switchover of the engine 12 from the fuel cut state to the fuel injection state on the decelerated travel. This makes it possible to allow the power-generation torque Tg that is outputted to be directed toward the deceleration to cancel out the engine torque that is outputted to be directed toward the acceleration. It is therefore possible to suppress the excessive variations in the vehicle deceleration. Thus, increasing the power-generation torque Tg makes it possible to suppress the excessive variations in the vehicle deceleration. Hence, it is possible to restart the fuel injection, without giving the occupant the sense of incongruity caused by the increase in the power-generation torque Tg, even in the case where the throttle valve 31 has been controlled openwise on the decelerated travel from viewpoint of getting the adequate amount of the power-generated electric power. In other words, it is possible to get the adequate amount of the power-generated electric power on the decelerated travel, without giving the sense of incongruity to the occupant.

Although some implementations of the technology have been described in the forgoing with reference to the accompanying drawings, the technology is by no means limited to the implementations described above. Various changes and modifications may be made to any implementation without departing from the scope of the technology. In the forgoing description, the decelerated travel of the vehicle 11 is exemplified by the coasting, i.e., inertia travel. However, this is non-limiting. For example, the power-generation torque of the starter generator 16 may be increased, in the case with the switchover of the engine 12 from the fuel cut state to the fuel injection state, on the decelerated travel on which the vehicle 11 decelerates, with the brake pedal being stepped down. Moreover, in the forgoing description, the starter generator 16 is adopted as the electric generator. However, this is non-limiting. A generator may be adopted that is not used as the electric motor.

In the forgoing description, in the main controller 60, incorporated are the engine control unit 61, the throttle control unit 62, the electric generator control unit 63, and the clutch control unit 64. However, the engine control unit 61, the throttle control unit 62, the electric generator control unit 63, or the clutch control unit 64, or any combination thereof, may be incorporated in another controller or other controllers. Moreover, in the forgoing description, the power-generation torque Tg is controlled on the basis of the number of rotations of the engine Ne, to increase the power-generation torque Tg in accompaniment with the switchover of the engine 12 to the fuel injection state. However, this is non-limiting. For example, the power-generation torque Tg may be controlled on the basis of the target deceleration on the decelerated travel, or alternatively, the power-generation torque Tg may be controlled on the basis of the throttle plate position.

In the forgoing description, the two electricity storage devices are coupled to the starter generator 16. However, this is non-limiting. A single electricity storage device may be coupled to the starter generator 16. Moreover, in the forgoing description, the lead battery 41 and the lithium-ion battery 42 are employed as the electricity storage devices to be coupled to the starter generator 16. However, this is non-limiting. Other kinds of batteries or capacitors may be adopted. Moreover, in the example illustrated in FIGS. 1 and 2, the switch SW2 is provided on the positive electrode line 44 of the lithium-ion battery 42. However, this is non-limiting. For example, as indicated by an alternate long and short dashed line in FIG. 2, the switch SW2 may be provided on the negative electrode line 48 of the lithium-ion battery 42.

The main controller 60, the engine control unit 61, the throttle control unit 62, the electric generator control unit 63, and the clutch control unit 64 illustrated in FIGS. 1 and 3 are each implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the main controller 60, the engine control unit 61, the throttle control unit 62, the electric generator control unit 63, or the clutch control unit 64, or any combination thereof. Such a medium may take many forms, including, but not limited to, any type of magnetic medium such as a hard disk, any type of optical medium such as a compact disc (CD) and a digital video disc (DVD), any type of semiconductor memory (i.e., semiconductor circuit) such as a volatile memory and a non-volatile memory. The volatile memory may include a dynamic random access memory (DRAM) and a static random access memory (SRAM), and the non-volatile memory may include a ROM and a non-volatile RAM (NVRAM). The ASIC is an integrated circuit (IC) customized to perform, and the FPGA is an integrated circuit designed to be configured after manufacturing in order to perform, all or a part of the functions of the main controller 60, the engine control unit 61, the throttle control unit 62, the electric generator control unit 63, and the clutch control unit 64 illustrated in FIGS. 1 and 3.

Although some implementations of the technology have been described in the foregoing by way of example with reference to the accompanying drawings, the technology is by no means limited to the implementations described above. The use of the terms first, second, etc. does not denote any order or importance, but rather the terms first, second, etc. are used to distinguish one element from another. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A control apparatus for a vehicle that includes an engine, the control apparatus comprising:
    an electric generator configured to be coupled to the engine;
    a lock up clutch configured to be coupled to the engine;
    a throttle valve configured to control an amount of intake air of the engine;
    an electric generator control unit configured to allow the electric generator to perform regenerative power generation on decelerated travel of the vehicle; and
    a throttle control unit configured to control the throttle valve openwise on the decelerated travel,
    the electric generator control unit being configured to cause an increase in power-generation torque of the electric generator, upon a switchover of the engine from a fuel cut state to a fuel injection state on the decelerated travel,
    wherein the throttle control unit controls the throttle valve from openwise to closewise, on a condition that the lock up clutch is controlled from an engaged state to a disengaged state, with the throttle valve having been controlled openwise on the decelerated travel.

2. The control apparatus for the vehicle according to claim 1, wherein the electric generator control unit controls the power-generation torque of the electric generator on a basis of a rotation speed of the engine, in causing the increase in the power-generation torque of the electric generator in accompaniment with the switchover of the engine to the fuel injection state.

3. The control apparatus for the vehicle according to claim 2, further comprising an engine control unit configured to control the engine, wherein
    the engine control unit executes an ignition retard control, in controlling the engine from the fuel cut state to the fuel injection state, the ignition retard control including retarding ignition timing.

4. The control apparatus for the vehicle according to claim 3, wherein, at a first time, in a coasting in which a stepping down of an accelerator pedal is released, the engine is controlled to the fuel cut state, the electric generator control unit is controlled to perform the regenerative power generation, and the lock up clutch is controlled to the engaged state.

5. The control apparatus for the vehicle according to claim 2, wherein, at a first time, in a coasting in which a stepping down of an accelerator pedal is released, the engine is controlled to the fuel cut state, the electric generator control unit is controlled to perform the regenerative power generation, and the lock up clutch is controlled to the engaged state.

6. The control apparatus for the vehicle according to claim 1, further comprising an engine control unit configured to control the engine, wherein
    the engine control unit executes an ignition retard control, in controlling the engine from the fuel cut state to the fuel injection state, the ignition retard control including retarding ignition timing.

7. The control apparatus for the vehicle according to claim 6, wherein, at a first time, in a coasting in which a stepping down of an accelerator pedal is released, the engine is controlled to the fuel cut state, the electric generator control unit is controlled to perform the regenerative power generation, and the lock up clutch is controlled to the engaged state.

8. The control apparatus for the vehicle according to claim 1, wherein, a throttle plate position is adjusted as to prevent a shortage of a negative pressure of an unexpected vacuum booster when the controlling controls the throttle valve openwise.

9. A control apparatus for a vehicle that includes an engine, the control apparatus comprising:
    an electric generator configured to be coupled to the engine;
    a lock up clutch configured to be coupled to the engine;
    a throttle valve configured to control an amount of intake air of the engine; and
    circuitry configured to allow the electric generator to perform regenerative power-generation on decelerated travel of the vehicle,
    control the throttle valve openwise on the decelerated travel, and
    cause an increase in power-generation torque of the electric generator, upon a switchover of the engine from a fuel cut state to a fuel injection state on the decelerated travel,
    wherein the throttle valve is controlled from openwise to closewise, on a condition that the lock up clutch is controlled from an engaged state to a disengaged state, with the throttle valve having been controlled openwise on the decelerated travel.

* * * * *